Sept. 3, 1929. C. R. SHORT ET AL Re. 17,425

AIR CLEANING DEVICE

Original Filed Nov. 17, 1919

Inventor
Charles R. Short
& Arthur L. Cash
By Blackmore, Spencer & Flint.
Attorney Reissued Sept. 3, 1929. Re. 17,425

UNITED STATES PATENT OFFICE.

CHARLES R. SHORT, OF DAYTON, OHIO, AND ARTHUR L. CASH, OF MARINE CITY, MICHIGAN, ASSIGNORS TO A C SPARK PLUG COMPANY, OF FLINT, MICHIGAN, A CORPORATION OF MICHIGAN.

AIR-CLEANING DEVICE.

Original No. 1,461,630, dated July 10, 1923, Serial No. 338,723, filed November 17, 1919. Application for reissue filed July 6, 1925. Serial No. 41,868.

Our invention relates to air cleaning devices designed for use in connection with internal combustion engines to prevent the entrance of dust or dirt into the carbureter, and from thence into the working cylinder of the engine; and particularly to air cleaning devices of the centrifugal type and in which the flow of air through the same is unobstructed as by the use of screens, or by the presence of a body of water through which the air flows, as has heretofore commonly been the case in air cleaning devices. Such air cleaning devices are used extensively with tractors designed for use in hauling agricultural machinery, in which service the dust present in the air causes abrasion of the pistons and cylinders, and a rapid wearing out of the engine, if it is permitted to pass through the carbureter and into the same.

The object of our invention is to provide an improved air cleaning device of the centrifugal type which will be simple in construction and effective for the purpose of separating dirt from the air which passes through the same and to the carbureter; the said device having features of construction and operation whereby the dirt is more effectively separated from the air, and a cleaner supply of air secured for the carbureter of the engine, than has heretofore commonly been the case.

Our invention is illustrated in its preferred form in the drawing accompanying and forming a part of this specification; although it will be appreciated that the drawing is for illustrative purposes only, and for the purpose of enabling our invention to be clearly understood; and that our invention includes all such variations and modifications of the particular embodiment thereof illustrated as come within the scope of the concluding claims.

Referring now to the drawing wherein the preferred embodiment of our invention is illustrated:

Figure 1:
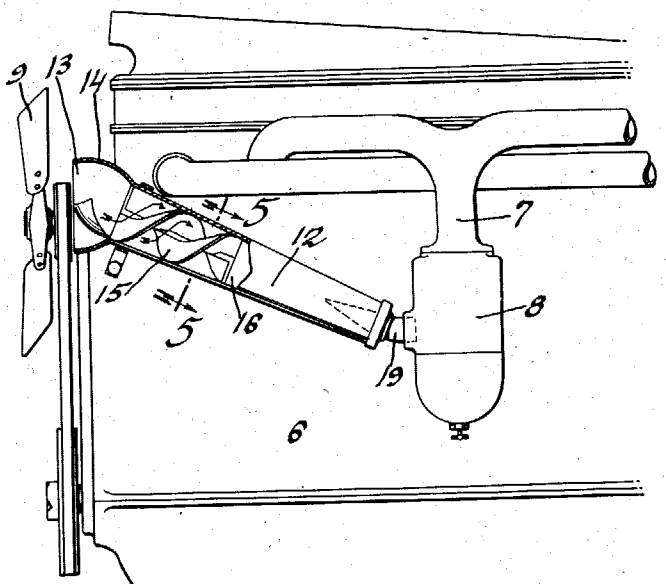
Fig. 1 is a view showing an internal combustion engine in outline, and in side elevation, the same being equipped with our improved air cleaning device.
Figure 2:
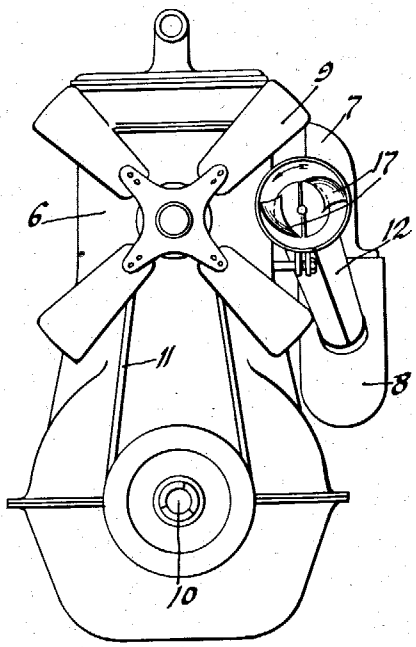
Fig. 2 is a view showing the engine and air cleaning device in elevation, and as seen from a position to the left of Fig. 1.
Figure 3:
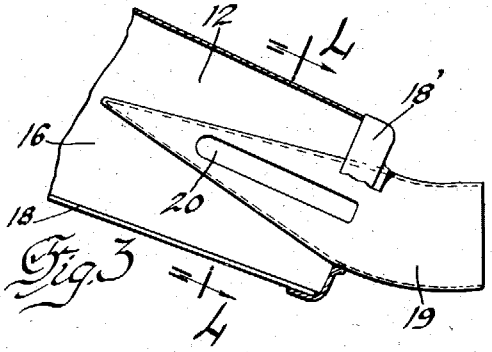
Fig. 3 is a view showing the lower end of the air cleaning device in section and upon a larger scale than in Fig. 1.
Figure 4:
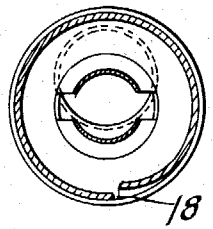
Fig. 4 is a view showing a section upon a transverse plane indicated by the line 4—4, Fig. 3.

Referring to the drawing, reference numeral 6 designates in a conventional manner an internal combustion engine of any kind or type to which combustible mixture is supplied through an inlet manifold 7 leading from a carbureter 8 of any preferred form. The engine as shown is provided with a fan 9, the purpose of which is to cause air to flow past the engine to thereby cool or assist in cooling same, as is usual in internal combustion engine practice, the fan being driven from the crankshaft 10 through a suitable belt 11.

Our improved centrifugal air cleaning device comprises a casing 12 which is preferably of approximately circular form in cross-section, and which casing is shown as arranged in an inclined position with its inlet end 13 located adjacent the fan 9, so that the fan will tend to force air into the casing under slight pressure. The inlet end of the casing is preferably provided with a flaring or funnel shaped portion 14 surrounding the same, to thereby collect air from the stream of air established by the fan and direct the same into the casing of the cleaner; the action of the funnel being in the nature of a scoop to increase the supply of air to the casing of the cleaner, and to cause the air within the casing to be at a pressure slightly greater than the pressure of the surrounding atmosphere. We wish here to distinctly state, however, that our improved air cleaner is capable of use in positions in which its inlet end is not located adjacent a cooling fan, or even with engines in which such a fan is not used; the flow of air through the casing under such circumstances being due entirely to the suction action of the engine, whereas when the casing is so arranged that the fan creates a flow of air thereinto an increased flow of air due both to the action of the fan and to the suction of the engine is secured.

The particles of dust, grit and other foreign matter which are carried thereinto with the stream of air entering the casing 12 are separated from the air by centrifugal action, such action being due to rotary motion imparted to the stream of air as it flows through the casing and as the result of which motion the particles of foreign matter are thrown to the outer portion of the body of air in accordance with well known physical phenomena.

The rotary motion above referred to is imparted to the stream of air flowing through the casing by a spirally arranged member 15 illustrated as in the form of a partition, although said member need not extend entirely across the interior of the casing, and which member preferably extends throughout a part only of the length of the casing 12 in the form of our invention illustrated and thus provides a chamber 16 between the inner end of the spirally arranged partition and the outer and discharge or outlet end of the casing. This whirling motion of the air may be increased by the use of spiral or inclined baffles 17 located within the flaring funnel shaped inlet portion 14 of the casing, although in many cases the spiral partition 15 will be found sufficient to impart sufficient rotary motion to the air to secure the separation of foreign matter therefrom by centrifugal action. It will be noted that members 15 and 17 are longitudinally inclined in the direction of the axis of the casing; that is, instead of being curved in a radial direction only, they are longitudinally inclined as well so that the air is set whirling and, at the same time, directed along the conduit to the carburetor.

Figure 5:
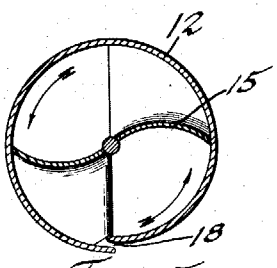
Fig. 5 is a view showing a section upon a transverse plane indicated by the lines 5—5, Fig. 1, and upon a larger scale than in said figure.

The casing 12 is provided with an opening or slot 18 extending longitudinally of the same and preferably throughout the entire length thereof, said slot being shown as provided by causing the side edges of the sheet of metal from which the casing 12 is formed to overlap one another, as best shown in Fig. 5, and by spacing said side edges apart from one another. The rotary motion imparted to the stream of air flowing through the casing causes the particles of dust and other foreign matter to move to the outside of the mass of air by centrifugal force, as said particles are heavier than the air, and, as the body of air continues to rotate within the casing, said particles pass out through the slot 18 one edge of which preferably projects slightly inward to act as a skimming means; such action being materially enhanced by the presence of the chamber 16 of considerable volume within the casing and within which chamber the body of air is in rotary motion, and along which chamber the opening or slot 18 extends throughout the entire length thereof in the embodiment of our invention illustrated. The separation of the dust particles from the stream of air flowing through the casing is also materially assisted and a cleaner supply of air secured because of the fact that the fan 9 is continuously forcing air into the casing, thus tending to maintain the air therein under slight pressure; which fact, in connection with the increased flow due to the fan, causes or tends to establish a continuous flow of air out from the casing through the slot 18, thus carrying the dust particles which are being continually concentrated in the outer portion of the rotating body of air out from the casing through the said slot.

The end of the casing opposite the air inlet end thereof is provided with a head 18′, and the reference numeral 19 designates an air outlet conduit through which the air passes from the interior of the casing to the carbureter 8 for use in the formation of the combustible mixture. This air conduit preferably extends through the head 18′ and for some little distance into the interior of the casing, and is provided within the casing with one or more openings 20 through which the air flows from the casing into the outlet conduit. The portion of the outlet conduit which is within the casing is preferably made conical in form, in order that its presence may interfere to the least possible extent with the rotary motion of the body of air within the chamber 16, and the fact that the inner end of said air outlet conduit is spaced apart from the wall of the casing provides a scheme whereby the air which flows to the carburetor is taken from the central portion of the mass of air within the casing, at which locality the air is the most free from foreign matter; as such foreign matter tends to pass to the outer limits of the rotating body of air and out through the slot 18, because of the centrifugal force resulting from the rotary motion imparted to the air. It will be noted that the cap 18′ and the adjacent portion of the casing 12 provide an annular dust trap surrounding the clean air outlet 19. This trap is normally occupied by a whirling body of air containing fine dust particles having insufficient momentum to effect their discharge through slot 18.

Attention is also called to the fact that the dust discharge slot 18 is tangentially arranged. This form of slot is most efficient because the natural line of travel of the dust particles is not interfered with and consequently their full momentum is available for their discharge.

It will be noted that the dust outlet or slot 18 and the clean air outlet openings 20 are each of much less cross section than the casing 12. The action of the fan in supplying air to the casing 12 tends to offset the influence of air friction and, if desired, may be made to insure substantially the same normal pressure at the carbureter intake proper as obtains in ordinary practice. It will be noticed also that the air passes through the cleaner without reversal of direction of flow which both reduces the cross sectional area of the casing and lessens the air friction. Certain features of the invention, particularly the general relation of parts, are not necessarily limited to centrifugal air cleaning devices.

We claim:

1. In a centrifugal air cleaner, an elongated casing approximately circular in cross-section and having an air inlet opening at one end and an air outlet opening of less cross-sectional area than said casing at the other end thereof, and which casing is provided with a slot extending longitudinally and throughout the entire length thereof; and a spirally arranged member located within said casing and extending throughout a part only of the length thereof, and which member is adapted to impart rotary motion to air flowing through said casing; said spirally arranged member being located adjacent the inlet end of said casing whereby an internal chamber is provided adjacent the outlet end of said casing.

2. In a centrifugal air cleaner, an elongated casing having an air inlet opening at one end thereof, and which casing is provided with a slot extending longitudinally thereof; a spirally formed partition located within said casing and extending throughout a part only of the length thereof, whereby a chamber is provided within said casing and beyond the end of said partition and which partition is adapted to impart rotary motion to air flowing through said casing; and an air outlet conduit extending into the chamber aforesaid at the end of said casing opposite said air inlet and having an opening through which air may flow, the area of said air outlet conduit being less than the area of said casing.

3. In a centrifugal air cleaner, an elongated casing having an air inlet opening at one end thereof, and which casing is provided with a slot extending longitudinally thereof; a spirally arranged partition located within said casing and adapted to impart rotary motion to air flowing therethrough; an internal chamber located adjacent the outlet end of said casing and an air outlet conduit extending into said chamber and spaced apart from the peripheral wall thereof and having an opening through which air may flow from said chamber, the portion of said outlet conduit within said chamber being conical in form and spaced apart from the wall thereof.

4. In a centrifugal air cleaner; an elongated casing approximately circular in cross-section and having an air inlet opening at one end thereof, and which casing is provided with a slot extending longitudinally and throughout the entire length thereof; a spirally arranged member located within said casing and extending throughout a part only of the length thereof, and which member is adapted to impart rotary motion to air flowing through said casing; and an air outlet conduit extending into the end of said casing opposite said air inlet and having an opening in its side walls through which air may flow from said casing, said conduit being conical in form within said casing and the wall thereof being spaced apart from the wall of said casing.

5. In combination in an internal combustion engine having a fan for causing air to flow past the same, a centrifugal air cleaner comprising an elongated casing having an air inlet opening located adjacent said fan, and an outlet opening of less cross-sectional area than said casing through which air may flow to the carbureter of the engine, and which casing is provided with a permanently open slot extending longitudinally and throughout approximately the entire length thereof; and through which air may flow directly to the surrounding atmosphere and a spirally arranged member located within said casing and extending throughout a part only of the length thereof, and which member is adapted to impart rotary motion to the air flowing through said casing.

6. In combination with a carbureter, air supply means therefor including a conduit in which air flows in a whirling stream to thereby separate impurities therefrom, said means including an air conduit having a laterally perforated substantially conical end projecting into said conduit substantially in line with the axis thereof.

7. In combination with a carbureter, air supply means therefor including a casing through which the air advances toward the carbureter in a whirling stream, said casing being arranged with its axis disposed at a considerable angle to the vertical, said casing also having a narrow slot along its under side in permanently open communication with the surrounding atmosphere and through which impurities are discharged by centrifugal action.

8. In combination with the carbureter of an internal combustion engine, a centrifugal air cleaner leading thereto and comprising an elongated casing having an air inlet opening at one end thereof and which casing is provided with an outlet slot, a spirally formed partition located within said casing and extending throughout a part only of the length thereof whereby a chamber is provided within said casing and beyond the end of said partition, and which partition is adapted to impart rotary motion to air flowing through said casing, and an air outlet conduit extending into the chamber aforesaid at the end of said casing opposite said air inlet, the area of said air outlet conduit being less than the area of said casing.

9. In combination with a source of suction, a centrifugal air cleaner leading thereto and comprising an elongated casing having an air inlet opening at one end thereof and which casing is provided with an outlet slot, a spirally formed partition located within said casing and extending throughout a part only of the length thereof whereby a chamber is provided within said casing and beyond the end of said partition, and which partition is adapted to impart rotary motion to air flowing through said casing, and an axial air outlet conduit communicating with the casing at one end thereof, the area of said air outlet conduit being less than the area of said casing.

10. In combination with a source of suction, a centrifugal air cleaner leading thereto comprising a casing of substantially circular cross-section provided at one end with an air inlet arranged to impart a whirling motion to the air entering the casing, said casing being provided with a clean air outlet of reduced cross-section compared with the cross-section of the casing, said outlet extending along the axis of the casing and being connected with the source of suction for supplying it with cleaned air from the region within the casing adjacent to the axis, and said casing being of thin material and provided at the other end and radially outward of the clean air outlet with a dust discharge slot arranged for the tangential discharge of dust, said slot being open to the atmosphere and being of relatively small size so that, when the cleaner is used with a source of suction only, the small volume of air entering the cleaner therethrough is ineffective to prevent simultaneous discharge of dust particles through the slot into the surrounding atmosphere.

11. In combination with a source of suction, a centrifugal air cleaner leading thereto comprising a casing of substantially circular cross-section provided at one end with an air inlet arranged to impart a whirling motion to the air entering the casing, said casing being provided with a clean air outlet of reduced cross-section compared with the cross-section of the casing, said outlet extending along the axis of the casing and being connected with the source of suction for supplying it with cleaned air from the region within the casing adjacent to the axis, and said casing being of thin material and provided at the other end and radially outward of the clean air outlet with a dust discharge slot in its side wall having its edges slightly offset in a radial direction to provide a restricted passage for the tangential discharge of dust, said slot being open to the atmosphere and its size being such that, when the cleaner is used with a source of suction only, the small volume of air entering the cleaner therethrough is ineffective to prevent simultaneous discharge of dust particles through the slot into the surrounding atmosphere.

In testimony whereof we affix our signatures.

CHARLES R. SHORT.
ARTHUR L. CASH.